(12) United States Patent
Yablokov et al.

(10) Patent No.: US 9,183,383 B1
(45) Date of Patent: Nov. 10, 2015

(54) SYSTEM AND METHOD OF LIMITING THE OPERATION OF TRUSTED APPLICATIONS IN PRESENCE OF SUSPICIOUS PROGRAMS

(71) Applicant: Kaspersky Lab ZAO, Moscow (RU)

(72) Inventors: Victor V. Yablokov, Moscow (RU);
Konstantin M. Filatov, Moscow (RU);
Evgeny Y. Eliseev, Moscow (RU);
Roman S. Unuchek, Moscow (RU)

(73) Assignee: AO Kaspersky Lab, Moscow (RU)

( * ) Notice: Subject to any disclaimer, the term of this patent is extended or adjusted under 35 U.S.C. 154(b) by 0 days.

(21) Appl. No.: 14/623,901

(22) Filed: Feb. 17, 2015

(30) Foreign Application Priority Data

Dec. 5, 2014 (RU) .................... 2014148962

(51) Int. Cl.
| | | |
|---|---|---|
| *G06F 21/56* | (2013.01) | |
| *G06F 21/62* | (2013.01) | |
| *G06F 21/55* | (2013.01) | |
| *G06F 12/14* | (2006.01) | |
| *G06F 21/74* | (2013.01) | |
| *G06F 21/88* | (2013.01) | |
| *G06F 21/12* | (2013.01) | |

(Continued)

(52) U.S. Cl.
CPC .............. *G06F 21/55* (2013.01); *G06F 12/14* (2013.01); *G06F 12/16* (2013.01); *G06F 21/12* (2013.01); *G06F 21/121* (2013.01); *G06F 21/44* (2013.01); *G06F 21/50* (2013.01); *G06F 21/554* (2013.01); *G06F 21/629* (2013.01); *G06F 21/6245* (2013.01); *G06F 21/6281* (2013.01); *G06F 21/74* (2013.01); *G06F 21/88* (2013.01); *G06F 2201/86* (2013.01); *G06F 2221/031* (2013.01); *G06F 2221/033* (2013.01)

(58) Field of Classification Search
CPC ..... G06F 21/554; G06F 21/55; G06F 21/568; G06F 21/44; G06F 21/50; G06F 21/74; G06F 21/629; G06F 21/6281; G06F 21/121; G06F 21/6245; G06F 2201/86; G06F 21/88; G06F 21/12; G06F 12/16; G06F 2221/031; G06F 12/14
See application file for complete search history.

(56) References Cited

U.S. PATENT DOCUMENTS

| | | | |
|---|---|---|---|
| 5,359,659 | A * | 10/1994 | Rosenthal ....................... 726/24 |
| 6,330,670 | B1 * | 12/2001 | England et al. .................. 713/2 |

(Continued)

OTHER PUBLICATIONS

Anonymous: "If You Suspect Malware is on Your Computer . . . —Anti-Malvertising.com", Nov. 18, 2014, XP055198750,Retrieved from the Internet: URL:http://web.archive.org/web/20141118152 530/http://www.anti-malvertising.com/if-yo u-suspect-malware-is-on-your-computer [retrieved on Jun. 29, 2015].

(Continued)

*Primary Examiner* — Michael Simitoski
(74) *Attorney, Agent, or Firm* — Arent Fox LLP; Michael Fainberg

(57) ABSTRACT

Disclosed are systems and methods for limiting the operation of trusted applications in presence of suspicious programs. An example method includes: identifying one or more trusted applications installed on a computer; collecting data about applications and programs installed on the computer; checking for the presence of one or more suspicious programs using suspicious program detection rules, wherein a program is considered to be suspicious when it can access protected information of a trusted application without authorization; and when at least one suspicious program is found, limiting the operation of the trusted application until the suspicious program is terminated or removed from the computer.

20 Claims, 3 Drawing Sheets

(51) Int. Cl.
*G06F 21/44* (2013.01)
*G06F 21/50* (2013.01)
*G06F 12/16* (2006.01)

(56) References Cited

U.S. PATENT DOCUMENTS

| | | | |
|---|---|---|---|
| 8,201,255 B1* | 6/2012 | Nachenberg | 726/24 |
| 8,239,915 B1* | 8/2012 | Satish et al. | 726/1 |
| 8,312,539 B1* | 11/2012 | Nachenberg et al. | 726/22 |
| 8,341,744 B1* | 12/2012 | Obrecht et al. | 726/24 |
| 8,499,350 B1 | 7/2013 | Satish | |
| 8,595,841 B2 | 11/2013 | Britton et al. | |
| 8,752,176 B2 | 6/2014 | Mahaffey et al. | |
| 8,862,181 B1* | 10/2014 | Cope et al. | 455/556.1 |
| 8,863,252 B1* | 10/2014 | Katzer et al. | 726/5 |
| 8,918,867 B1* | 12/2014 | Salour | 726/22 |
| 2002/0116639 A1* | 8/2002 | Chefalas et al. | 713/201 |
| 2003/0194094 A1* | 10/2003 | Lampson et al. | 380/282 |
| 2005/0216577 A1* | 9/2005 | Durham et al. | 709/223 |
| 2005/0223239 A1* | 10/2005 | Dotan | 713/188 |
| 2006/0075501 A1 | 4/2006 | Thomas et al. | |
| 2006/0259873 A1* | 11/2006 | Mister | 715/781 |
| 2007/0094260 A1* | 4/2007 | Murphy et al. | 707/9 |
| 2007/0234061 A1* | 10/2007 | Teo | 713/178 |
| 2007/0240222 A1 | 10/2007 | Tuvell et al. | |
| 2008/0168562 A1* | 7/2008 | Haga et al. | 726/23 |
| 2009/0006232 A1* | 1/2009 | Gallagher et al. | 705/35 |
| 2009/0037486 A1* | 2/2009 | Ozawa | 707/200 |
| 2009/0210702 A1* | 8/2009 | Welingkar et al. | 713/156 |
| 2010/0011029 A1* | 1/2010 | Niemela | 707/200 |
| 2010/0306850 A1* | 12/2010 | Barile et al. | 726/25 |
| 2011/0047620 A1* | 2/2011 | Mahaffey et al. | 726/23 |
| 2011/0083186 A1* | 4/2011 | Niemela et al. | 726/24 |
| 2012/0222120 A1* | 8/2012 | Rim et al. | 726/24 |
| 2012/0240236 A1* | 9/2012 | Wyatt et al. | 726/25 |
| 2013/0097318 A1* | 4/2013 | Gladstone et al. | 709/226 |
| 2013/0212684 A1* | 8/2013 | Li et al. | 726/25 |
| 2014/0032759 A1* | 1/2014 | Barton et al. | 709/225 |
| 2014/0128047 A1* | 5/2014 | Edwards et al. | 455/415 |
| 2014/0150106 A1* | 5/2014 | Butler et al. | 726/24 |
| 2014/0245376 A1* | 8/2014 | Hibbert et al. | 726/1 |
| 2014/0283031 A1* | 9/2014 | Eksten et al. | 726/22 |
| 2014/0373153 A1* | 12/2014 | Niemela | 726/24 |
| 2015/0101047 A1* | 4/2015 | Sridhara et al. | 726/23 |

OTHER PUBLICATIONS

Seung-Hyun Seo et al: "Detecting mobile malware threats to homeland security through static analysis", Journal of Network and Computer Applications, vol. 38, Feb. 1, 2014, pp. 43-53, XP055198807, ISSN: 1084-8045, DOI: 10.1016/j.jnca.2013.05.008.

* cited by examiner

SYSTEM AND METHOD OF LIMITING THE OPERATION OF TRUSTED APPLICATIONS IN PRESENCE OF SUSPICIOUS PROGRAMS

CROSS-REFERENCE TO RELATED APPLICATIONS

This application claims benefit of priority under 35 U.S.C. 119(a)-(d) to a Russian Application No. 2014148962 filed on Dec. 5, 2014, which is incorporated by reference herein.

FIELD OF TECHNOLOGY

This disclosure generally relates to the field of antivirus security and, specifically, to systems and methods for limiting the operation trusted application in presence of suspicious programs.

BACKGROUND

The increasing popularity of the use of mobile telephones is motivating developers to create mobile applications for information processing, including processing of personal user data. Similar trends are resulting in the functionality of malicious applications being often directed at stealing personal data. Information about purchases, personal contacts, SMS messages, photographs, video clips, documents and the like is personal data and can be stolen and used without the knowledge of the owner.

An antivirus program makes it possible to analyze, terminate and remove malicious applications. However, for a number of reasons, the antivirus program cannot provide complete protection and prevent all instances of stealing of personal data. One example might be a situation when a mobile application which has been verified at the moment by the antivirus program and is not malicious has permission for example to read SMS messages (contacts, mail, photographs, video clips, and so forth). In this case, it is necessary to employ other more effective methods of information protection.

The reading of SMS messages or contacts by an application is not a stealing of personal data, but the processing and transmission of information about contacts may result in stealing of this information. For example, when applications are being installed for the Android® OS, a list of permissions is always displayed, which must be approved in order to install the application. For example, an application may require permissions to be included on the list of recipients of incoming SMS messages. After the user approves listed permissions and the application is then installed, it will receive incoming SMS messages. In one instance, the application may be a modified and improved message manager, which makes it possible to shorten the search time for messages desired by the user. In another instance, the application can search among all incoming messages and utilize for its purposes SMS messages containing a onetime password to perform a financial operation (e.g., the Zeus-in-the-mobile Trojan horse).

Thus, situations arise where there is information that some mobile application might be potentially dangerous, but antivirus software is unable to confirm or deny the actual stealing of personal data by the mobile application.

SUMMARY

Disclosed are example aspects of system, methods and computer program products for limiting the operation of trusted applications in presence of suspicious programs. One example method includes identifying, by a hardware processor, one or more trusted applications installed on a computer; collecting data about applications and programs installed on the computer; checking for the presence of one or more suspicious programs using suspicious program detection rules, wherein a program is considered to be suspicious when it can access protected information of a trusted application without authorization; when at least one suspicious program is found, limiting the operation of the trusted application until the suspicious program is terminated or removed from the computer.

In one example aspect, identifying a trusted application includes checking the database of known trusted applications.

In one example aspect, identifying a trusted application includes checking user provided designation of the application.

In one example aspect, identifying a trusted application includes applying trusted application analysis rules.

In one example aspect, a trusted application analysis rules checks a plurality of conditions including one or more of: whether an application has two or more permissions for reading of user data; whether an application has a good rating from users; whether an application has a large number of downloads from the app store; whether an application belongs to a category of trusted software; and whether the application's signature contains a certificate of a known legitimate software producer.

In one example aspect, checking for the presence of one or more suspicious programs includes applying one or more suspicious program detection rules.

In one example aspect, a suspicious program detection rule checks a plurality of conditions including one or more of: whether a program contains identification data of a financial institution, but does not belong to the category of financial software; whether a program is able to make screenshots when a certain event occurs; whether a program is able to read, modify and send SMS messages; and whether a program is able to intercept Data SMS messages transmitted via one or more ports of trusted applications or an antivirus program.

In one example aspect, a system for limiting the operation of trusted applications in presence of suspicious programs comprises: a memory storing a plurality of software applications and program; and a hardware processor coupled to the memory and configured to: identify one or more trusted applications in the memory; collect data about applications and programs; check for the presence of one or more suspicious programs using suspicious program detection rules, wherein a program is considered to be suspicious when it can access protected information of a trusted application without authorization; when at least one suspicious program is found, limit the operation of the trusted application until the suspicious program is terminated or removed from the computer.

In one example aspect, a computer program product, stored on a non-transitory computer readable medium, wherein the computer program product includes computer executable instructions for limiting the operation of trusted applications in presence of suspicious programs, including instructions for: identifying one or more trusted applications installed on a computer; collecting data about applications and programs installed on the computer; checking for the presence of one or more suspicious programs using suspicious program detection rules, wherein a program is considered to be suspicious when it can access protected information of a trusted application without authorization; when at least one suspicious program is found, limiting the operation of the trusted application until the suspicious program is terminated or removed from the computer.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and particularly pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Example aspects are described herein in the context of a system, method and computer program product for limiting the operation of trusted applications in presence of suspicious programs. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Modern software processes information which may be an object of interest to hackers. For example, mobile applications created to facilitate banking transactions typically use a two-factor authentication: in this case, a user, using a mobile application which is installed on his mobile computer network, must enter a username and a password, and the bank sends an SMS with a onetime password. If a hacker, using malicious program, learns of the username and password and has the ability to intercept the SMS message with the onetime password on the user's device, he will be able to perform an online transaction in place of the user. Therefore, the execution of the backing application must be limited until all suspicious and harmful programs have been removed. In order to successfully protect the user data, a system is used for limiting the operation of trusted applications when presence of a suspicious program is detected.

Figure 1:
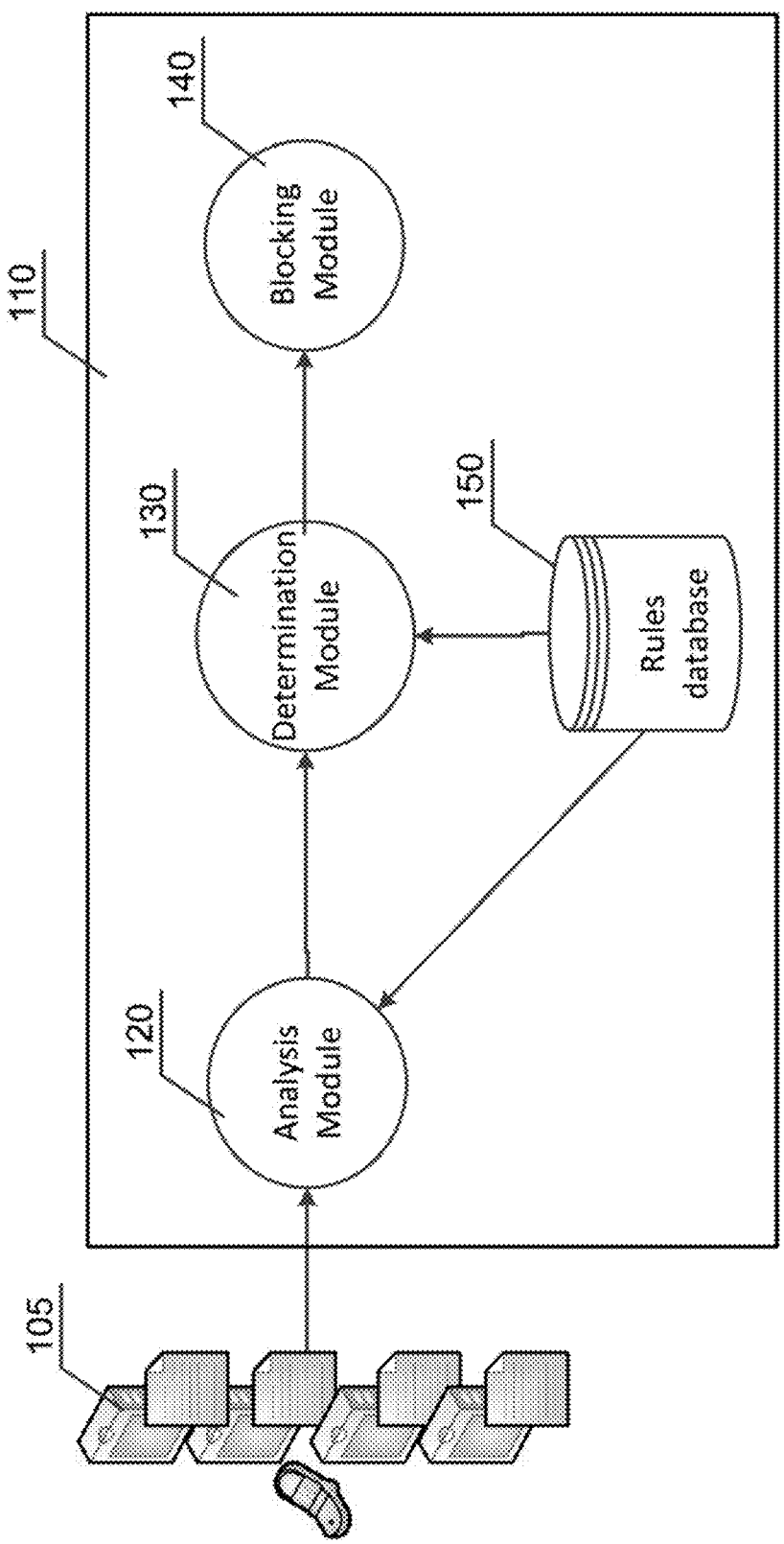
FIG. 1 illustrates a block diagram of an example system for limiting the operation of trusted applications in presence of suspicious programs.

FIG. 1 shows a block diagram of an example system for limiting the operation of trusted applications in presence of suspicious applications according to one aspect of the invention. The system 110 for limiting the operation of trusted applications in presence of suspicious programs on a user device 105 includes an analysis module 120, a determination module 130, a blocking module 140, and a rules database 150. The device 105 may includes, but not limited to, a personal computer, a laptop, a table, a mobile communication device, such as smart phone, or other computer devices.

In one example aspect, the analysis module 120 of the system 110 may be configured to determine, among the applications installed on the computer 105, a trusted application whose operation produces protected information.

Generally, the trusted applications may include, but not limited to, applications that are released by legitimate software manufactures for processing of user data, including personal data. A trusted application does not contain malicious code.

Generally, protected information may include, but not limited to, proprietary information that is subject to protection in accordance with some contractual or statutory legal requirements or requirements imposed by the owner of the information. One of the most widespread examples of protected information is user authentication data, such as usernames and passwords to various websites.

The presence of user authentication data on a user device 105 may be of increased interest to hackers.

Trusted applications that process protected information are of special interest to the writers of malicious programs. An example of trusted applications that process protected information may include, but not limited to: banking applications (the protected information is the username, the password, and the onetime password obtained via SMS), applications for processing of corporate emails (the protected information is the username, the password and the certificate), e-commerce applications (the protected information is the username, the password, and the bank card number).

In one example aspect, the analysis module 120 can identify a trusted application by searching among the installed applications for trusted applications from a database of trusted applications. In this case, the database of trusted applications contains information on trusted applications and on the corresponding protected information. An example of a database of trusted applications is presented in Table 1.

TABLE 1

| Name of application | Software developer | Protected information |
|---|---|---|
| Sberbank online | Sberbank of Russia | Username, password, onetime password from SMS. |
| Aliexpress | Alibaba.com Hong Kong Limited | Username, password, card number. |
| ... | ... | ... |

In another example aspect, the trusted application can be determined by an explicit user designation. The user may independently designates the trusted application and selects the information being protected.

In another example aspect, the trusted application can be determined using trusted application analysis rules. For example, a trusted application analysis rule can require the fulfillment of one or more of the following condition:
    has two or more permissions for reading of user data,
    has a good rating from users,
    has a large number of downloads from the app store (such as Google Play),
    belongs to a certain category of software, such as "finance", the signature contains the certificate of a known legitimate software producer
(e.g., developer.android.com/tools/publishing/app-signing.html)

If the application satisfies one or more of the above conditions, then that application can be considered to be trusted by the analysis module 120.

In another example aspect, an additional condition to the above trusted application analysis rules may be the presence of the following fact: during execution of application, specifically after the processing of a group of user data, such as username and password, an important event has occurred, which can be intercepted by other applications, such as the production of an SMS message or a Data SMS with a onetime password and or a session and call number (with pin code communication) and so forth.

Yet in another example, a trusted application analysis rule may determine if the application has characteristic information of a trusted software category, such as the logo of a bank (category "finance"), other bank attributes, such as the bank particulars or routing code, and the application can be used to perform a payment operation, then that application can considered to be trusted by the analysis module 120.

Thus, the analysis module 120 may be configured to collect data on the applications and programs installed on user device 105 and identify trusted applications among the installed applications. The collected data may include, but not limited to, information about application developer, the authorizations/rights of access, the rating and number of downloads and commentaries from the app store, the signature of the certificate of the software producer, a check sum of the application, and other data.

The analysis module 120 is further configured to transmit the collected data about trusted and other installed applications and programs to the determination module 130.

In another example aspect, the determination module 130 is configured to detect at least one suspicious program, which is able to process protected information without authorization associated with the trusted application, using data about the trusted application and other installed programs using suspicious program detection rules.

Suspicious programs may include programs capable of accessing and processing protected information without authorization, such as user or system authorization. Processing of information without authorization means accessing information or operations with information that occur in violation of the established rights and (or) rules of access to information or operations with information using the standard means of a computer system or means of analogous functional purpose and technical characteristics. An example of unauthorized data processing can be the processing by a suspicious program of an SMS message with a onetime password, e.g., to perform a transaction such that the user does not receive notification of the new message. The message may be read and removed, or remain read without additional notifications to the user.

For example, characteristic features of suspicious programs may include, but not limited to: autorun of the application in response to certain events or conditions, presence of DeviceAdmin (e.g., developer.android.com/guide/topics/admin/device-admin.html)
obtaining administrator rights, attempting to hide its operation, downloading of executable code from the Internet, and so on. This description is fit by the malicious program which is classified as a lotoor.

In another example, when using the application Battle.net Authenticator, to authorize the launching of the game application on a personal computer the user needs to enter a one-time password. When launching the game application on a personal computer, the user enters his username and password. After this, the user enters the onetime password which is generated automatically on the server after entering the main username and password, and displayed in the application Battle.Net Authenticator, installed on the mobile device of the user. Thus, intercepting the main username and password and control of the mobile application Battle.net Authenticator allows hackers to perform any given operations in place of the user. In this case, the application Battle.net Authenticator may be blocked until the removal of suspicious programs that can process incoming traffic or produce and process a screenshot of the current condition.

In one example aspect, the rules database 150 may store suspicious program detection rules and trusted application analysis rules. Various kinds of databases can be used as the rules database 150, including, but not limited to: hierarchical (IMS, TDMS, System 2000), network (Cerebrum, Cronospro, DBVist), relational (DB2, Informix, Microsoft SQL Server), object-oriented (Jasmine, Versant, POET), object-relational (Oracle Database, PostgreSQL, FirstSQL/J, functional, and so forth.

The suspicious program detection rules may include a set of conditions such that, when fulfilled, a program is considered to be suspicious. The conditions in the rules may vary depending on information about known behavior of malware. Examples of rules are:

1. If an application contains identification data of a bank (telephone numbers, names, PSRN, BIC, and so on), URL, logotype, but does not belong to the category of "finance", then that application is considered to be suspicious.
2. If the application is able to make screenshots when a certain event occurs, then that application is considered to be suspicious.
3. If the application is able to read, modify, and send SMS messages, then that application is considered to be suspicious.
4. If the application has the ability to intercept Data SMS messages transmitted via the ports of trusted applications or antivirus programs, then that application is considered to be suspicious.

In one example aspect, the determination module 130 can place the application in a virtual environment to emulate its operation. If as a result of the emulation of the application it turns out that there is access in one way or another to a trusted application, for example, one in the category of "finance", or protected information, then that application will be considered suspicious by the determination module 130.

If at least one suspicious program is discovered, the determination module 130 may send the result of the discovery to the blocking module 140.

In one example aspect, the blocking module 140 is designed to limit the operation of the trusted application upon discovery of at least one suspicious program. The limitation can be removed after the termination or removal of suspicious programs. For example, the blocking module 140 may limit the operation of the trusted application by terminating operation of the trusted application, block entry of user passwords, blocking user access to the application's user interface or its various elements, and other actions.

In one example, the blocking module 140 on the basis of data about the applications installed on user device 105, the trusted application and the suspicious programs produces a list of actions which need to be performed in order to remove the limitation from the trusted application. An example might be the following list:

1st action—pausing or terminating execution of the suspicious program A.

2nd action—removal of suspicious program B.

The blocking module 140 after executing the required list of actions is configured to remove the limitation from the trusted application.

Figure 2:
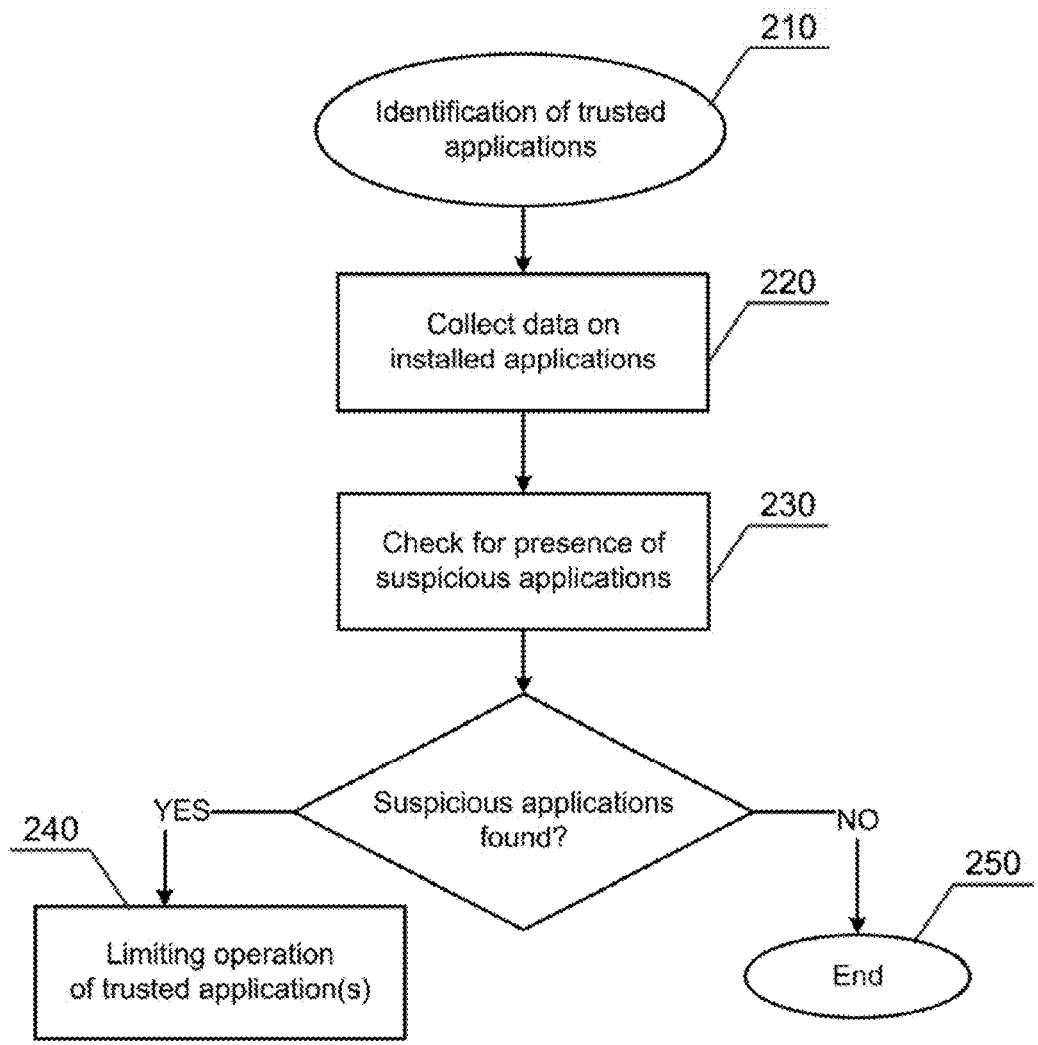
FIG. 2 illustrates a flow diagram of an example method for limiting the operation of trusted applications in presence of suspicious programs.

FIG. 2 shows a flow diagram of an example method for limiting the operation of trusted applications in presence of suspicious programs. In step 210, the analysis module 120 identifies trusted application among the installed applications. In step 220, the analysis module 120 collects data on the installed applications and sends the data on the trusted application and the installed applications to the determination module 130. In step 230, the determination module 130 checks for the presence of suspicious programs using suspicious program detection rules. The determination module 130 determines if at least one suspicious program has been found which can process protected information without authorization, on the basis of data on the trusted application and other installed applications. If a suspicious program has been found, in step 240, the analysis module 120 sends the data on the at least one suspicious program to the blocking module 140, which limits the operation of the trusted application. If no suspicious programs were found, the processing ends at step 250.

Figure 3:
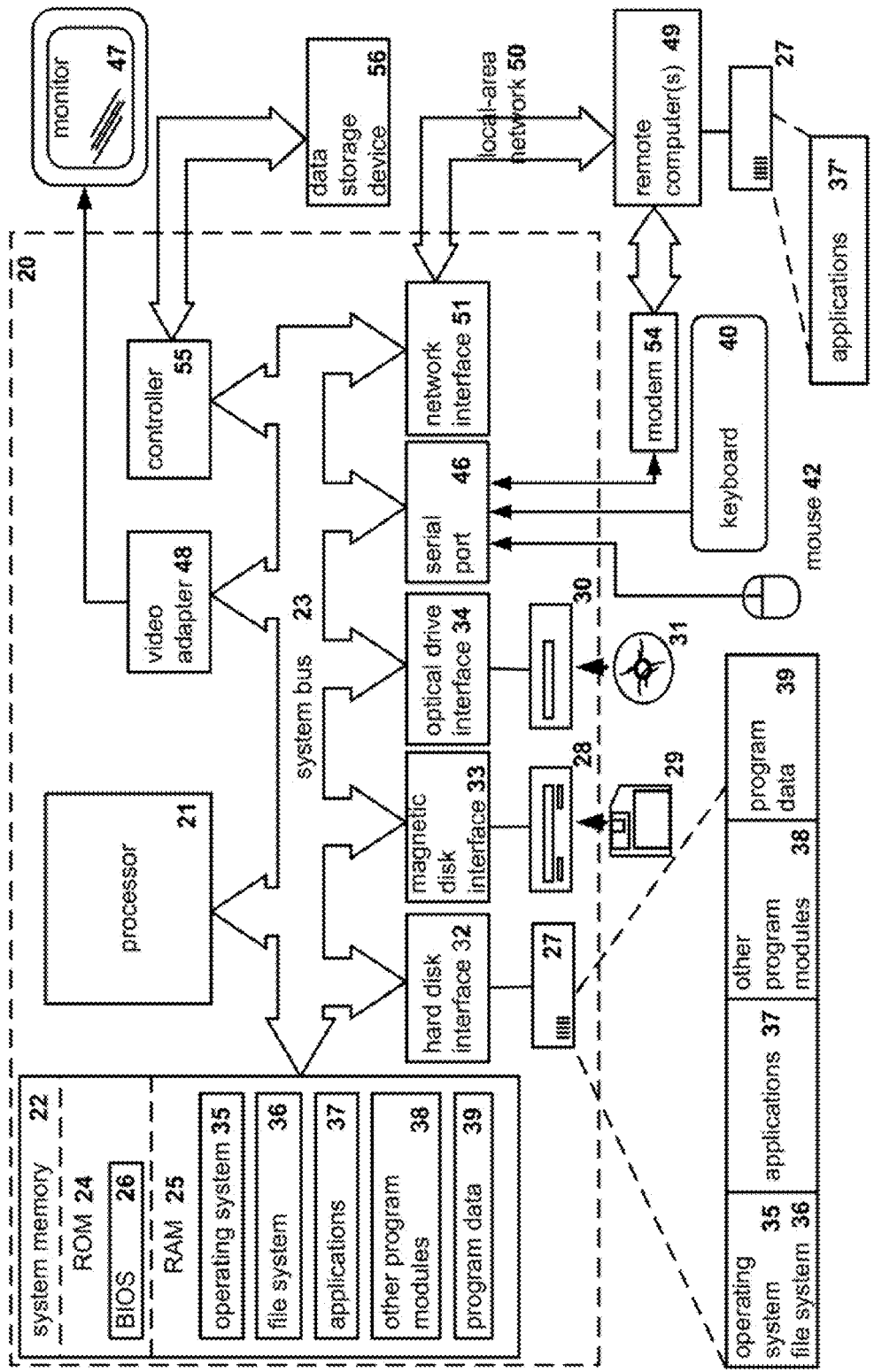
FIG. 3 illustrates an example of a general-purpose computer that may be used to implement systems and methods for limiting the operation of trusted applications in presence of suspicious programs.

FIG. 3 shows an example of a general-purpose computer system (which may be a personal computer or a server) 20, which may be used to implement aspects of system and methods disclosed herein. The computer system 20 includes a central processing unit 21, a system memory 22 and a system bus 23 connecting the various system components, including the memory associated with the central processing unit 21. The system bus 23 is realized like any bus structure known from the prior art, including in turn a bus memory or bus memory controller, a peripheral bus and a local bus, which is able to interact with any other bus architecture. The system memory includes read only memory (ROM) 24 and random-access memory (RAM) 25. The basic input/output system (BIOS) 26 includes the basic procedures ensuring the transfer of information between elements of the personal computer 20, such as those at the time of loading the operating system with the use of the ROM 24.

The personal computer 20, in turn, includes a hard disk 27 for reading and writing of data, a magnetic disk drive 28 for reading and writing on removable magnetic disks 29 and an optical drive 30 for reading and writing on removable optical disks 31, such as CD-ROM, DVD-ROM and other optical information media. The hard disk 27, the magnetic disk drive 28, and the optical drive 30 are connected to the system bus 23 across the hard disk interface 32, the magnetic disk interface 33 and the optical drive interface 34, respectively. The drives and the corresponding computer information media are power-independent modules for storage of computer instructions, data structures, program modules and other data of the personal computer 20.

The present disclosure provides the implementation of a system that uses a hard disk 27, a removable magnetic disk 29 and a removable optical disk 31, but it should be understood that it is possible to employ other types of computer information media 56 which are able to store data in a form readable by a computer (solid state drives, flash memory cards, digital disks, random-access memory (RAM) and so on), which are connected to the system bus 23 via the controller 55.

The computer 20 has a file system 36, where the recorded operating system 35 is kept, and also additional program applications 37, other program modules 38 and program data 39. The user is able to enter commands and information into the personal computer 20 by using input devices (keyboard 40, mouse 42). Other input devices (not shown) can be used: microphone, joystick, game controller, scanner, and so on. Such input devices usually plug into the computer system 20 through a serial port 46, which in turn is connected to the system bus, but they can be connected in other ways, for example, with the aid of a parallel port, a game port or a universal serial bus (USB). A monitor 47 or other type of display device is also connected to the system bus 23 across an interface, such as a video adapter 48. In addition to the monitor 47, the personal computer can be equipped with other peripheral output devices (not shown), such as loudspeakers, a printer, and so on.

The personal computer 20 is able to work in a network environment, using a network connection to one or more remote computers 49. The remote computer (or computers) 49 are also personal computers or servers having the majority or all of the aforementioned elements in describing the nature of a personal computer 20, as shown in FIG. 3. Other devices can also be present in the computer network, such as routers, network stations, peer devices or other network nodes.

Network connections can form a local-area computer network (LAN) 50 and a wide-area computer network (WAN). Such networks are used in corporate computer networks and internal company networks, and they generally have access to the Internet. In LAN or WAN networks, the personal computer 20 is connected to the local-area network 50 across a network adapter or network interface 51. When networks are used, the personal computer 20 can employ a modem 54 or other modules for providing communications with a wide-area computer network such as the Internet. The modem 54, which is an internal or external device, is connected to the system bus 23 by a serial port 46. It should be noted that the network connections are only examples and need not depict the exact configuration of the network, i.e., in reality there are other ways of establishing a connection of one computer to another by technical communication modules.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field-programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 3 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the present disclosure, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for limiting the operation of trusted applications in presence of suspicious programs, the method comprising:
    identifying, by a hardware processor, one or more trusted applications installed on a computer;
    collecting, by the hardware processor, data relating to the identified one or more trusted applications and to programs installed on the computer;
    detecting, based at least partially on the collected data, one or more suspicious programs using suspicious program detection rules indicating that the one or more suspicious programs can access protected information of a given trusted application of the identified one or more trusted applications without authorization;
    upon detecting at least one suspicious program, temporarily limiting an operation of the given trusted application;
    producing, based on both the data relating to the identified one or more trusted applications and data relating to the detected at least one suspicious program, a list of actions to remove or terminate the at least one suspicious program from the computer; and
    removing limitation of the operation of the given trusted application after the list of actions are performed to remove or terminate the at least one suspicious program from the computer.

2. The method of claim 1, wherein identifying the one or more trusted applications includes checking a database of known trusted applications.

3. The method of claim 1, wherein identifying the one or more trusted applications includes checking a user provided designation of an application.

4. The method of claim 1, wherein identifying the one or more trusted applications includes applying trusted application analysis rules.

5. The method of claim 4, wherein the trusted application analysis rules check a plurality of conditions including one or more of:
    whether an application has two or more permissions for reading user data;
    whether an application has a good rating from users;
    whether an application has a large number of downloads from an app store;
    whether an application belongs to a category of trusted software; and
    whether an application's signature contains a certificate of a known legitimate software producer.

6. The method of claim 1, wherein identifying the one or more suspicious programs includes applying one or more suspicious program detection rules.

7. The method of claim 6, wherein the one or more suspicious program detection rules check a plurality of conditions including one or more of:
    whether a program contains identification data of a financial institution, but does not belong to a category of financial software;
    whether a program is able to make screenshots when a certain event occurs;
    whether a program is able to read, modify and send SMS messages; and
    whether a program is able to intercept Data SMS messages transmitted via one or more ports of trusted applications or an antivirus program.

8. A system for limiting the operation of trusted applications in presence of suspicious programs, the system comprising:
    a memory storing a plurality of software applications and program; and
    a hardware processor coupled to the memory and configured to:
        identify one or more trusted applications in the memory;
        collect data relating to the identified one or more trusted applications and to the programs;
        detect, based at least partially on the collected data, one or more suspicious programs using suspicious program detection rules indicating that the one or more suspicious programs can access protected information of a given trusted application of the identified one or more trusted applications without authorization;
        upon detecting at least one suspicious program, temporarily limit an operation of the given trusted application;
        produce, based on both the data relating to the identified one or more trusted applications and data relating to the detected at least one suspicious program, a list of actions to remove or terminate the at least one suspicious program from the computer; and
        remove limitation of the operation of the given trusted application after the list of actions are performed to remove or terminate the at least one suspicious program from the computer.

9. The system of claim 8, wherein identifying the one or more trusted applications includes checking a database of known trusted applications.

10. The system of claim 8, wherein identifying the one or more trusted applications includes checking a user provided designation of an application.

11. The system of claim 8, wherein identifying the one or more trusted applications includes applying trusted application analysis rules.

12. The system of claim 11, wherein the trusted application analysis rules check a plurality of conditions including one or more of:
- whether an application has two or more permissions for reading user data;
- whether an application has a good rating from users;
- whether an application has a large number of downloads from an app store;
- whether an application belongs to a category of trusted software; and
- whether an application's signature contains a certificate of a known legitimate software producer.

13. The system of claim 8, wherein identifying the one or more suspicious programs includes applying one or more suspicious program detection rules.

14. The system of claim 13, wherein the one or more suspicious program detection rules check a plurality of conditions including one or more of:
- whether a program contains identification data of a financial institution, but does not belong to a category of financial software;
- whether a program is able to make screenshots when a certain event occurs;
- whether a program is able to read, modify and send SMS messages; and
- whether a program is able to intercept Data SMS messages transmitted via one or more ports of trusted applications or an antivirus program.

15. A computer program product, stored on a non-transitory computer readable medium, wherein the computer program product includes computer executable instructions for limiting the operation of trusted applications in presence of suspicious programs, including instructions for:
- identifying one or more trusted applications installed on a computer;
- collecting, by the hardware processor, data relating to the identified one or more trusted applications and to programs installed on the computer;
- detecting, based at least partially on the collected data, one or more suspicious programs using suspicious program detection rules indicating that the one or more suspicious programs can access protected information of a given trusted application of the identified one or more trusted applications without authorization;
- upon detecting at least one suspicious program, temporarily limiting an operation of the given trusted application;
- producing, based on both the data relating to the identified one or more trusted applications and data relating to the detected at least one suspicious program, a list of actions to remove or terminate the at least one suspicious program from the computer; and
- removing limitation of the operation of the given trusted application after the list of actions are performed to remove or terminate the at least one suspicious program from the computer.

16. The product of claim 15, wherein the instructions for identifying the one or more trusted applications include instructions for checking a database of known trusted applications.

17. The product of claim 15, wherein the instructions for identifying the one or more trusted applications include instructions for checking a user provided designation of an application.

18. The product of claim 15, wherein the instructions for identifying the one or more trusted applications include instructions for applying trusted application analysis rules that check a plurality of conditions including one or more of:
- whether an application has two or more permissions for reading user data;
- whether an application has a good rating from users;
- whether an application has a large number of downloads from an app store;
- whether an application belongs to a category of trusted software; and
- whether an application's signature contains a certificate of a known legitimate software producer.

19. The product of claim 15, wherein identifying the one or more suspicious programs includes applying one or more suspicious program detection rules.

20. The product of claim 19, wherein the one or more suspicious program detection rules check a plurality of conditions including one or more of:
- whether a program contains identification data of a financial institution, but does not belong to a category of financial software;
- whether a program is able to make screenshots when a certain event occurs;
- whether a program is able to read, modify and send SMS messages; and
- whether a program is able to intercept Data SMS messages transmitted via one or more ports of trusted applications or an antivirus program.

* * * * *